Oct. 16, 1956  M. I. DARROW ET AL  2,766,756
DEBEAKING OF POULTRY CHICKS
Filed July 6, 1953
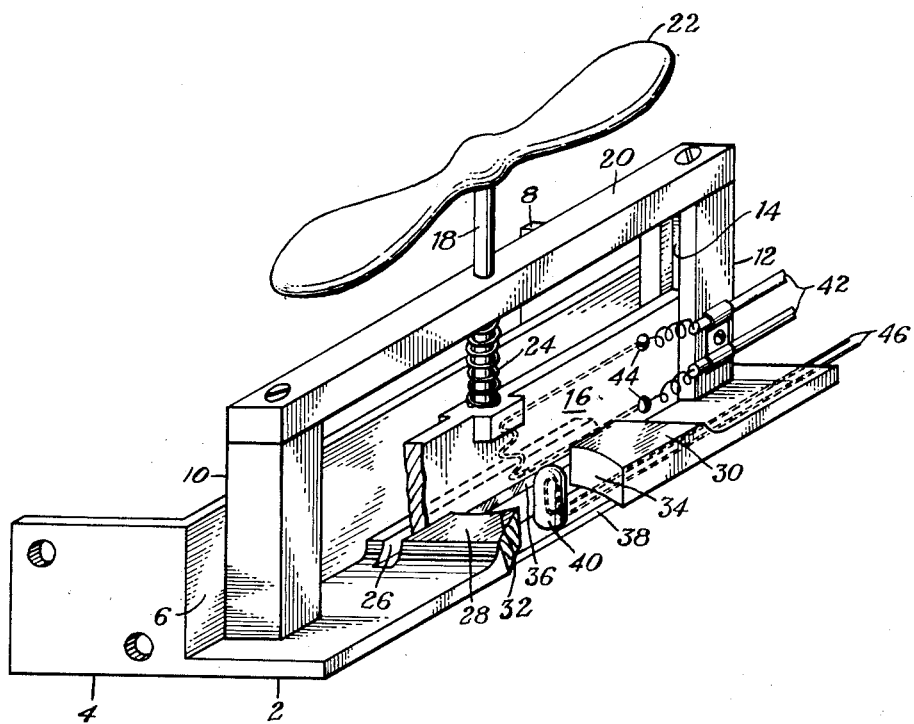
MERRITT I. DARROW
CHESTER E. STOTTS
INVENTORS
BY
ATTORNEY

United States Patent Office 2,766,756
Patented Oct. 16, 1956

2,766,756
DEBEAKING OF POULTRY CHICKS

Merritt I. Darrow, Chicago, and Chester E. Stotts, Forest Park, Ill., assignors to Swift & Company, Chicago, Ill., a corporation of Illinois Application July 6, 1953, Serial No. 366,208

11 Claims. (Cl. 128—303.1)

The present invention relates to the debeaking of domestic birds. More specifically, the invention is directed to a method and apparatus which may be used in the debeaking of exceptionally young poultry.

Debeaking has been practiced in the poultry field inasmuch as it has been determined that the reduction of beak growth controls undesirable habits formed by growing poultry. As soon as the beaks of chicks have reached sufficient growth, tendencies are developed in the chicks to put the beaks to detrimental use. Such practices as cannibalism and picking directed toward other poultry result in sufficient damage so that upon the reaching of marketing age a certain percentage of the chicks are found to be unmarketable. The cannibalistic tendency may result in the death of a certain percentage of the poultry, while the picking results in the development of bareback and "blue-back" poultry. These developments may be extremely damaging to the overall value of a brood.

Debeaking as commonly practiced has been found to be effective only after the chicks or poults have reached an age of several weeks. It has been considered necessary to wait until the chicks are several weeks old before successful debeaking can be accomplished so that the beak growth may be sufficiently controlled to ensure that feather picking will not take place prior to the reaching of market age. Debeaking at an extremely young age has been attempted in an effort to cut down the handling difficulties present when debeaking is carried out on older chicks. An attempt has been made to cut back the beaks of extremely young poultry sufficiently far so as to destroy or remove the main portion of the growth bud. This has been proven somewhat dangerous in that it is necessary to remove the beak to at least one-eighth of an inch from the nostril. A bird debeaked to this extent occasionally develops a nasal infection or other detrimental nostril involvements. It has therefore not been considered profitable to debeak poultry prior to their attainment of at least several weeks of age.

It is therefore an object of the present invention to debeak extremely young poultry in such a manner as to sufficiently retard detrimental beak growth.

It is another object to remove the upper mandible of extremely young chicks or poults in such a manner as to remove the detrimental effects caused by developed beaks, and yet retain the desirable functions thereof.

Other objects not specifically set forth will become apparent from the following detailed description.

The present invention contemplates the removal of the beaks from day-old or extremely young poultry by removing a substantial portion of the beak from the bird, sufficiently damaging the growth bud and thereby retarding any substantial regrowth of the beak, and doing all of this in such a manner as to protect the nostrils from subsequent infection.

It has been found that day-old chicks may be debeaked in accordance with the teachings of the present invention without the accompanying regrowth or nasal infection occasionally experienced when extremely young chicks are debeaked in accordance with known methods. The upper mandible of poultry contains a region in which a growth bud is housed. This region is close to the nostrils. While the growth bud may be destroyed by debeaking within one-eighth of an inch of the nostrils, serious nasal infections have been known to follow. If only one-third to one-half of the upper mandible may be removed, the nostrils are left with sufficient protection so that nasal infection will not occur as a result of debeaking. However, this type of removal is not sufficient to destroy the growth bud, but it has now been found that the growth bud may be destroyed concurrently with the removal of from one-third to one-half of the upper mandible. This may be accomplished by subjecting the underside of the upper mandible to a growth bud destroying agent at the same time that a portion of the upper mandible is removed. In this manner the beak is not only cut back but its regrowth is sufficiently retarded. The proposed manner of practicing the teachings of the present invention will become apparent from the following detailed description of the operation of a single embodiment of the type of apparatus which may be used as shown in the accompanying drawing.

In the drawing:

The apparatus shown comprises base plate 2 which has attached thereto flanges 4, 6, and 8 for purposes of maintaining the base plate in a position where the operation may be conveniently carried out. Attached to the base plate 2 is a vertical blade housing which is composed of frame members 10 and 12. These frame members each contain a longitudinal slot 14 which runs the entire length thereof. Slot 14 of vertical frame member 12 can be clearly seen in the drawing, whereas the slot of vertical member 10 is not shown. In these slots blade 16 is slidably mounted. The blade is attached or mounted on stem 18 which controls the movement of the blade while the slots guide the blade. Stem 18 reciprocates through a bearing or opening in the cross frame member 20 of the vertical blade housing. As can be clearly seen, the cross frame member 20 is mounted on the top surface of the vertical frame members 10 and 12. Handle 22 is attached to the uppermost end of stem 18. By reason of handle 22 and stem 18, the blade 16 may be reciprocated within the frame defined by members 10, 12, and 20.

Spring 24 mounted on stem 18 between the top surface of blade 16 and the bottom surface of cross frame member 20 holds blade 16 against base plate 2. The bottom edge of blade 16 is forced by spring 24 against base plate 2 in a groove position on base plate 2 and defined by the raised portions 26, 28, and 30 of the base plate. These raised portions extend to the same height. As can be seen in the drawing, base plate 2 is cut away at its front and center portion. This cut away portion is defined by the curved vertical faces 32 and 34 of the raised portions 28 and 30. This opening defined by the cut away portion extends back to raised portion 26, and the center portion of the front vertical face of blade 16 is exposed at this point. The bottom edge of the blade is beveled as shown at 36.

Spanning the opening between raised portions 28 and 30 is a bar 38 which is attached to the bottom side of base plate 2. At the center of bar 38 is mounted a projection 40 which extends to a height slightly above that of the raised portions 26, 28, and 30. Heating elements 42 are embedded in blade 16 and are detachable at the binding posts 44 if so desired. The elements 42 extend to the center portion of blade 16 as is shown by the dotted lines in the drawing. Heating elements 46 extend into base plate 2 and are carried along bar 38 and up into the center of projection 40. The position of these elements is also clearly shown by the dotted lines along the base plate, bar, and projection.

In the operation of the device shown in the drawing the blade 16 is raised by the application of a lifting force on handle 22, thereby compressing spring 24. A very young chick is placed in position to have its upper mandible partially removed by forcing the mandibles apart and placing the lower face of the upper mandible over the projection 40, resting the rear portion of the upper mandible on the top of the projection, resting the foremost portion of the upper mandible on the top surface of raised portion 26, and placing the lower mandible below bar 38 in a position where it will not be affected by the operation. The blade is then lowered by releasing the handle and thereby allowing the spring to expand and force the blade down to rest in the groove defined by the raised portions 26, 28, and 30. The beveled edge 36 of blade 16 shears off the outer portion of the upper mandible when it passes the upper front edge of raised portion 26. The remaining portion of the upper mandible is then forced by the blade in a downward position until the blade comes to rest in the groove. By reason of this downwardly forcing of the remainder of the upper mandible, the lower face of the rear portion of it is forced to press down against the upper surface of projection 40. Vertical surfaces 32 and 34 are curved inwardly toward the front portion of base plate 2 so as to come within comparatively close proximity to each other. While vertical surface 32 is cut away in the drawing, it is to be understood that it curves inwardly as does vertical surface 34. This restricts the width of the opening at the foremost edge of base plate 2 and affords a rest for the rearmost portion of the upper mandible. The upper mandible thereby is eventually, during the course of the operation, supported on three different points, the first being the top surface of raised portion 26, the second being the uppermost surface of projection 40, and the third being the foremost edges of raised portions 28 and 30. These three points ensure sufficient support to carry out the operation.

The shearing action is further aided by heating blade 16. This is carried out by the use of heating elements 42 which have their exposed portion embedded in blade 16. These elements are shown to extend to the center portion of blade 16 where a concentration of the heat is most desirable. At this point the shearing action takes place, and under normal operating conditions the center of the blade should be at a temperature sufficient to make it red hot. The use of a heated blade not only aids in the shearing action but it also helps to smooth off the sheared mandible and aids in the control of any bleeding which might possibly take place. Heated elements 46 are embedded in projection 40 where the heat supplied is utilized to burn the growth bud housed in the rear portion of the upper mandible. As the top portion of heated projection 40 is forced into the underportion of the upper mandible, the heat from the projection destroys the growth bud sufficiently so as to prevent any subsequent growth of the upper mandible. The time of contact between the upper mandible and the heated projection 40 amounts to only a comparatively short interval and thereby no harm is done by the application of heat to any other portions of the chick. For example, no detrimental effects are forthcoming from extensive application of heat to the nostril area. As can be seen, it is only necessary to force the upper mandible down on the heated projection 40 for a very short time. Due to this fact the blade 16 may be raised almost immediately following the completion of its descent by contact with the bottom of the groove. The two actions of shearing and searing are concurrent and consequently instantaneous. Due to this fact, the operation of the device as shown in the drawing may be made automatic and debeaking may be carried out at a fast pace, such speed being controlled only by the ability of the operator to place the chicks in the proper position. Such a device as shown is highly efficient, inexpensive to construct, simple to maintain and repair, and very inexpensive to operate. Various modifications of the device shown in the drawing may be successfully used. For example, spring 24 could be positioned on stem 18 between handle 22 and cross member 20. In such a position spring 24 could keep blade 16 in a raised condition when not in use. Under such circumstances, all that would be necessary to operate the device would be downward pressure applied to handle 22.

As can be seen from the foregoing detailed description of the present invention, the principal object to be obtained is that of simultaneously debeaking, with growth bud destruction. Such an operation is two-fold in purpose and may be carried out instantaneously by utilizing apparatus similar in principle to that shown in the drawing. Other methods of destroying the growth bud may be utilized. While it is normally considered necessary to burn the growth bud in some manner so as to destroy it, such an operation may be carried out either by the utilization of a heated projection as shown in the drawing, or by the use of a projection coated with a caustic such as sodium hydroxide and potassium hydroxide. In utilizing the latter procedure the caustic would be forced into contact with the growth bud, protected only by a very thin membrane as is found in extremely young chicks. The caustic produces a similar result in that it sears the growth bud, thereby destroying it and ensuring no substantial future growth of the upper mandible.

When internal heating is used, as shown in the drawing, it is desirable to isolate the heat as much as possible so that the entire device will not become too hot to handle. As is apparent, such devices to be used are comparatively small as the chicks to be debeaked are quite small. It may be desirable to insulate bar 38 between projection 40 and the base plate 2. This may be done in any desirable and conventional manner. It also may be desirable to insulate grooves 14 in such a manner as to isolate the heat supplied to blade 16 from the rest of the device. Due to the comparatively larger surface area or size of blade 16 with respect to bar 38, it is not absolutely necessary that the blade be insulated. The heat conducted is not substantial enough to heat up the entire device so as to make it unsatisfactory.

As aforementioned, by the utilization of such a device, as shown in the drawing, in practicing the method set forth by the present invention, the upper mandible of extremely young poultry may be removed to the extent of from one-third to one-half. This allows sufficient beak remaining to afford protection against nostril infection and yet removes a sufficient portion of the upper mandible so as to destroy the efficiency of the entire beak as a damaging instrument. The two mandibles no longer meet at their outermost points, and it is therefore impossible for poultry to pick one another or damage one another to any substantial degree. While picking or other damaging action is no longer possible, the desirable functions of the beak remain intact. The lower mandible being allowed to develop normally continues to exercise its function of scooping or collecting food for the chick. Therefore, it can be assured that the chick will have sufficient means at its disposal to feed properly and develop in the normal manner.

In order to remove the desired amount from the upper mandible, it is only necessary to regulate the depth of raised portion 26 from its foremost edge to the point where it adjoins flange 6. This depth may be fixed so that anywhere from one-third to one-half of the upper mandible of the poults will be removed. With this depth fixed, the length of upper mandibles in extremely young poultry will not vary sufficiently so that more than one-half of the upper mandible will be removed or less than one-third of the upper mandible will be removed.

The principles of the present invention may be applied to any type of bird where beak growth control is desired. The method and apparatus as set forth is highly effective and the results obtained bring about a reduction in losses and a much more manageable domestic bird.

Obviously, many modifications and variations of the invention as hereinbefore set forth may be made without departing from the spirit and scope thereof, and therefore only such limitations should be imposed as are indicated in the appended claims.

We claim:

1. A method of debeaking birds which comprises: removing a substantial portion of the upper mandible of said bird and simultaneously treating the lower face of said mandible with a growth bud destroying agent to destroy the growth bud housed therein.

2. A method of debeaking poultry and retarding regrowth of the beak which comprises: supporting the upper mandible of a bird in at least two points on the underside thereof, imparting a shearing force to the upper surface of said mandible cooperative with one of the said points of support and simultaneously treating the lower face of said mandible with a growth bud destroying agent at said other point of support.

3. A method of debeaking birds and retarding regrowth of the beak which comprises: removing about one-half of the upper mandible of said bird and simultaneously subjecting the lower face of the remaining portion of said upper mandible to a burning agent to substantially destroy the growth bud housed therein.

4. A method of debeaking poultry which comprises: supporting the upper mandible of a bird at two points, urging said upper mandible into contact with said points of support, shearing said beak at one point of support and simultaneously with said shearing action, treating the growth bud housed in said upper mandible with heat to substantially destroy said growth bud.

5. A debeaking device which comprises a blade housing in combination with a base plate; a blade slidably mounted in said blade housing and cooperating with said base plate; and an upright element mounted on said base plate and positioned adjacent the point of contact of said blade with said base plate.

6. A debeaking device which comprises a blade housing in combination with a base plate, said blade housing comprising vertical slotted members and a horizontal cross member attached to the upper portions of said vertical slotted members; a blade mounted in said blade housing and cooperating with the slots of said vertical slotted members, said blade being movable and slidable in said slots; a stem attached to said blade extending to a bearing position in said blade housing cross member; means attached to the opposite end of said stem from said blade which is capable of supplying movement to said stem and said blade; a horizontal groove in said base plate with which said blade cooperates at the furthermost point of its downward travel; raised portions defining said groove on both sides of said blade, the raised portion on one side of said blade containing a groove which extends through said base plate; an upright member positioned in said groove and extending above the last mentioned raised portion, said upright member attached to said base plate by a bar extending across said last-mentioned groove.

7. A debeaking device which comprises a blade housing in combination with a base plate; a blade slidably mounted in said blade housing and cooperating with said base plate; an upright element mounted on said base plate and positioned adjacent the point of contact of said blade with said base plate, and heating means for said upright element at least a portion of which is positioned within said upright element whereby the beak of a bird may be shorn by said blade and forced against said upright element to substantially destroy the growth bud housed therein.

8. A method of debeaking a bird and retarding regrowth of the beak which comprises: separating the upper and lower mandibles of said bird, supporting said upper mandible on the underside thereof and, while maintaining the upper and lower mandibles in the separated position, imparting a shearing force to the upper surface of said supported mandible cooperative with said support and burning the lower face of said mandible to substantially destroy the growth bud housed therein.

9. A debeaking device which comprises: shearing means mounted on a base plate to remove a portion of the upper mandible of a bird, an upright member mounted on said base plate adjacent the point of contact of said shearing means and said base plate to contact the underside of said upper mandible, and heating means, at least a portion of which is positioned within said upright member whereby to burn the growth bud housed in said upper mandible of said bird.

10. A debeaking device which comprises: a blade housing in combination with a base plate; a blade slidably mounted in said blade housing and cooperating with said base plate; a heating element in communication with said blade whereby the central portion of said blade is capable of being maintained at a high temperature; an upright member mounted on said base plate and positioned near the point of contact of said blade with said base plate; means to heat said upright element whereby said upright element may be maintained at a high temperature; the said upright element and said blade being positioned with relation to each other in such a manner that the beak of the bird may be shorn by said blade and simultaneously forced against said upright element to substantially destroy the growth but in said beak.

11. A debeaking device which comprises: shearing means in combination with an upright member having means to heat said upright member whereby the beak of a bird may be shorn by said shearing means and forced against said upright member to substantially destroy the growth bud housed therein.

References Cited in the file of this patent

UNITED STATES PATENTS

| | | |
|---|---|---|
| 2,359,569 | Lyon | Oct. 3, 1944 |
| 2,385,633 | Lyon | Sept. 25, 1945 |
| 2,420,582 | Bowman et al. | May 13, 1947 |
| 2,501,283 | McKnight | Mar. 21, 1950 |
| 2,505,559 | Lyon | Apr. 25, 1950 |